Aug. 5, 1969    H. SCHAINHOLZ ET AL    3,460,154
INDIVIDUAL SELECTIVE RESPONSE RECORDER
Filed Oct. 13, 1966    6 Sheets-Sheet 1

*INVENTORS*
Herbert Schainholz
Peter Katz

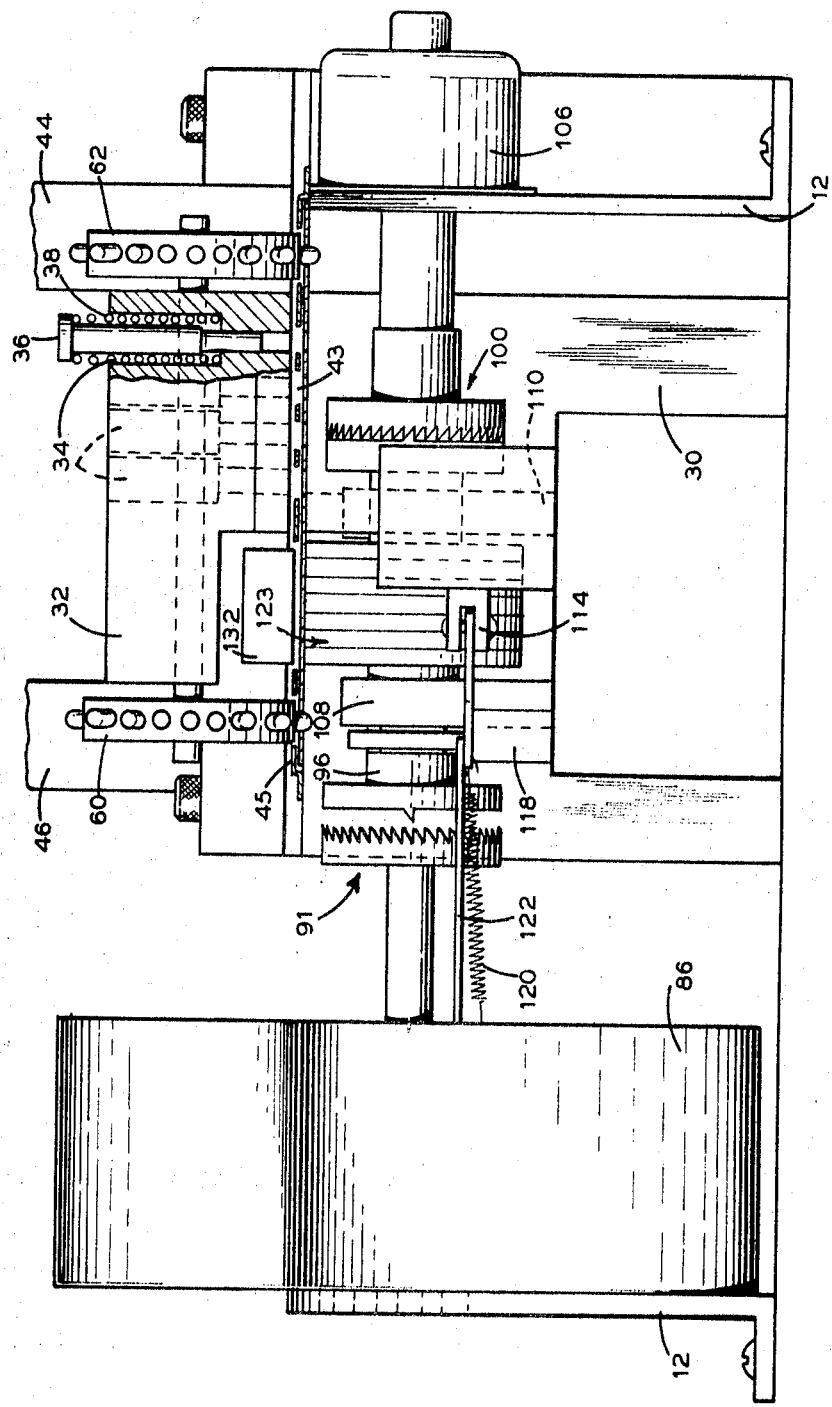

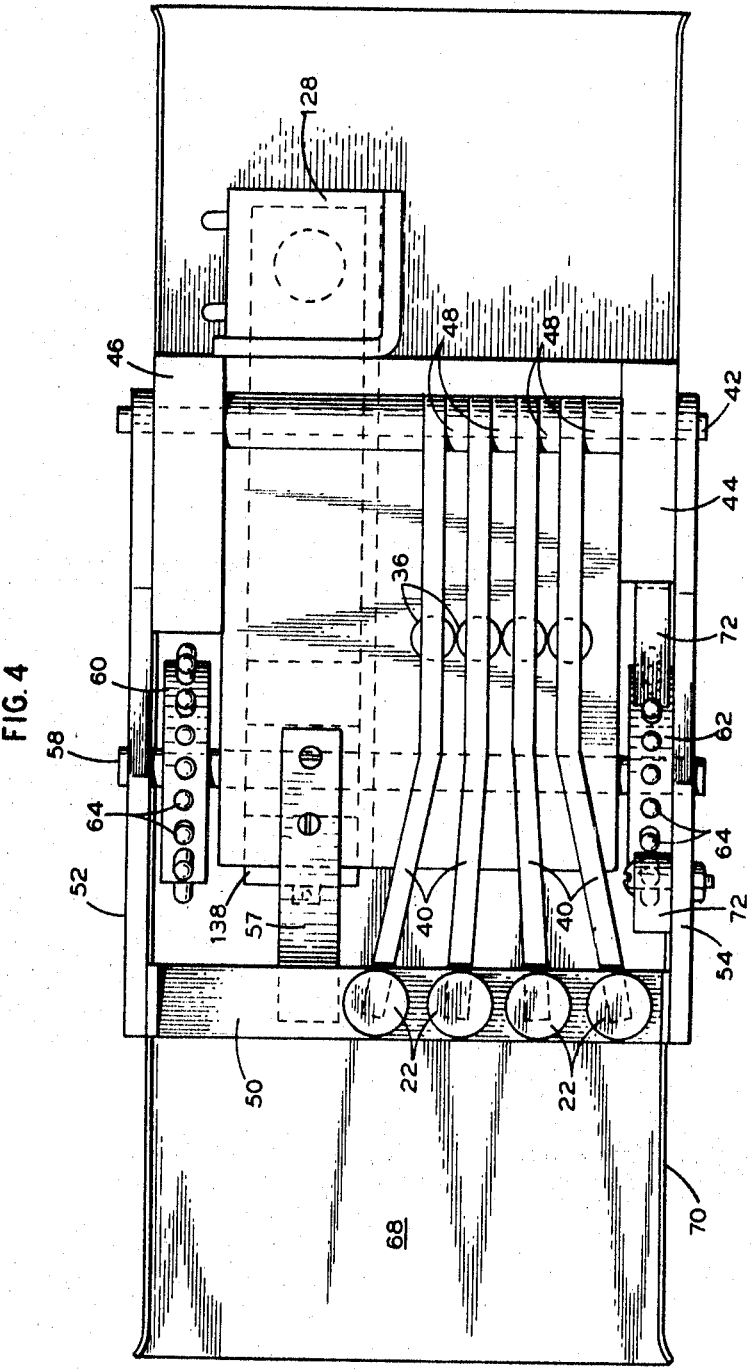

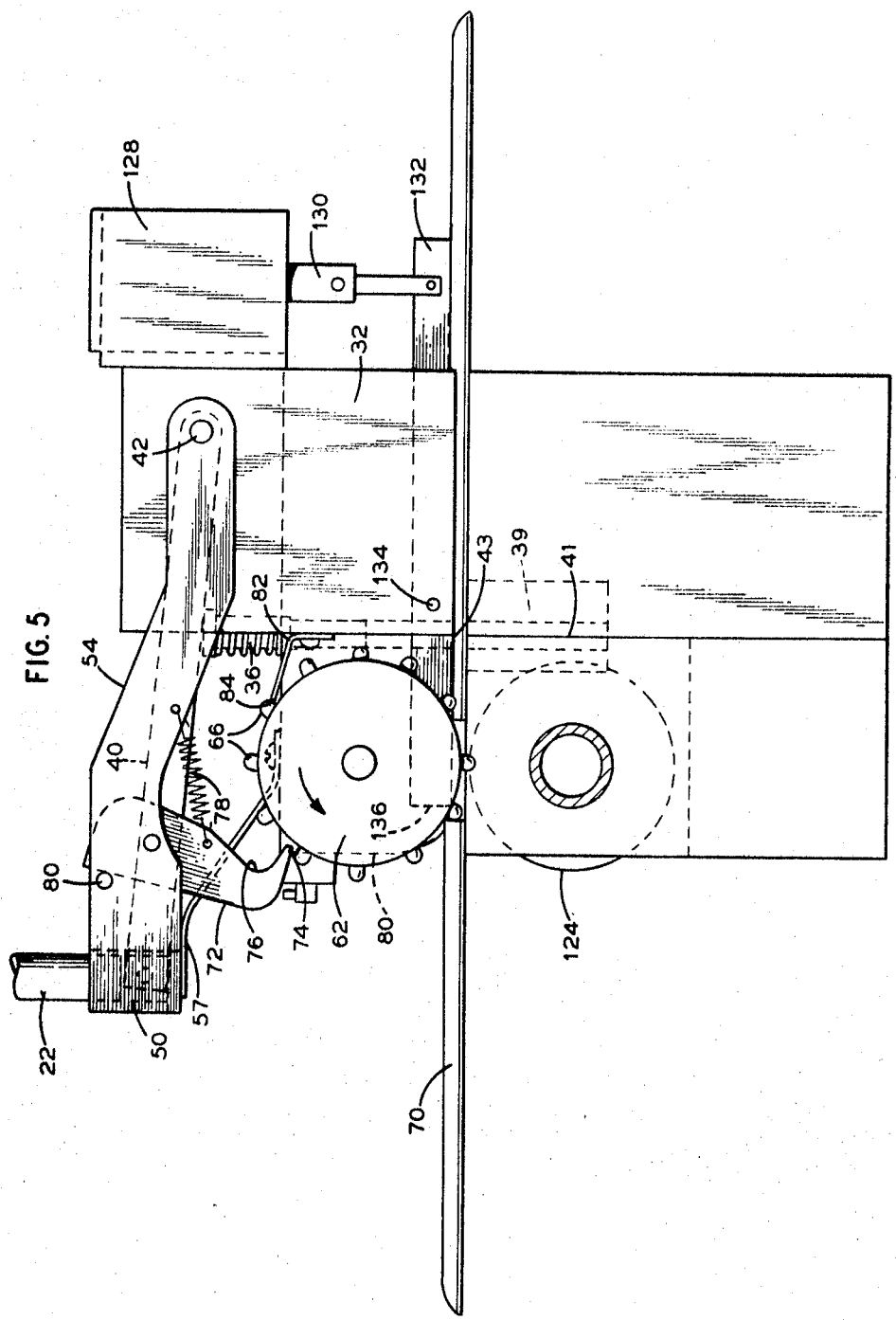

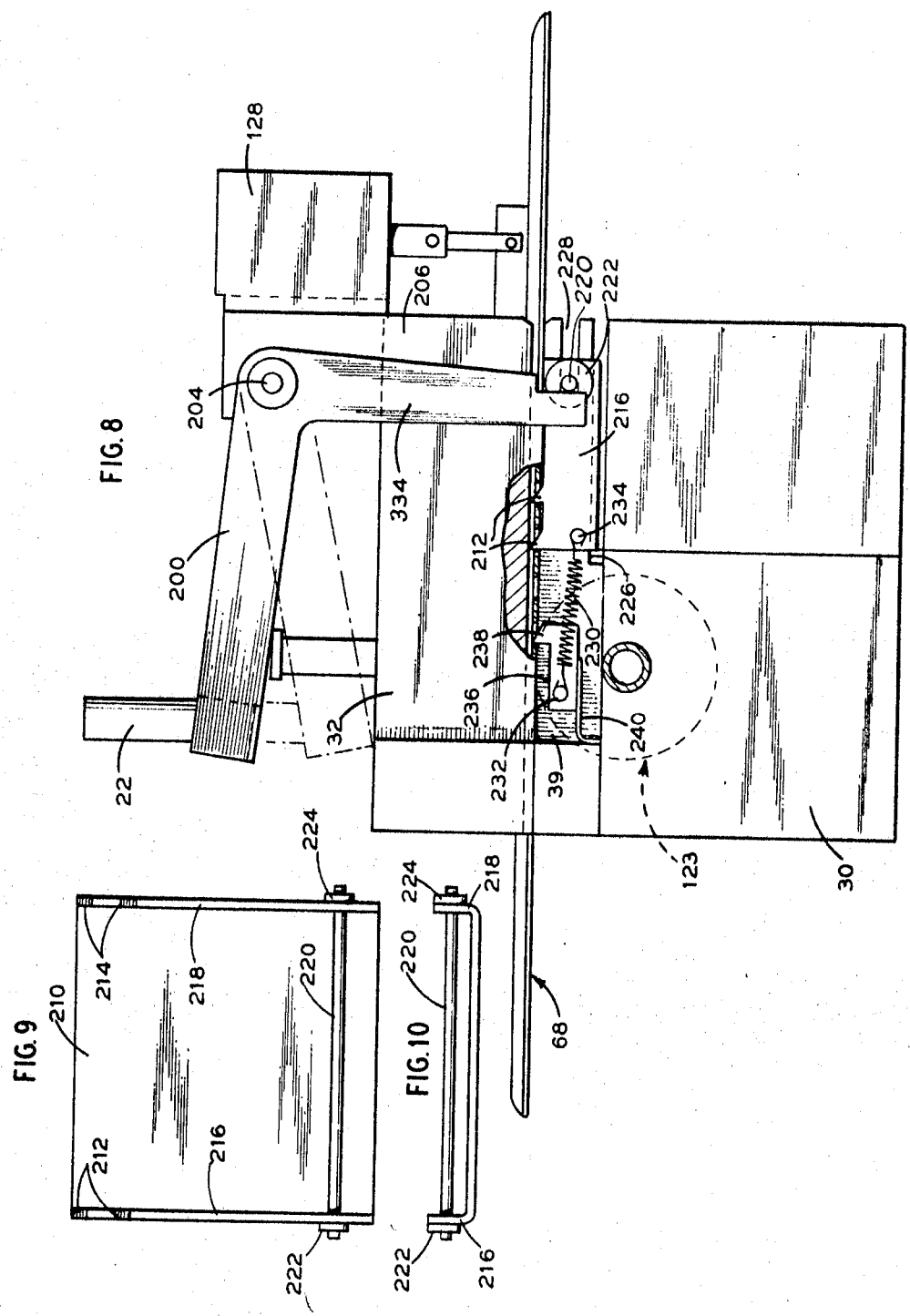

United States Patent Office 3,460,154
Patented Aug. 5, 1969

3,460,154
INDIVIDUAL SELECTIVE RESPONSE RECORDER
Herbert Schainholz, New York, N.Y., and Peter Katz, Livingston, N.J., assignors to Edgar A. Rosenberg, New York, N.Y.
Filed Oct. 13, 1966, Ser. No. 586,431
Claims priority, application Great Britain, Oct. 21, 1965, 44,586/65
Int. Cl. G01d 9/28, 9/36, 15/04
U.S. Cl. 346—60                                9 Claims

ABSTRACT OF THE DISCLOSURE

A response recorder is provided which has means for recording on a punch card, an operator's response, the exact time of the recording, and selected code symbols which uniquely identify the operator. Discrete, mutually exclusive, mechanical and electrical timing means are also provided for automatically indicating the time that a response is recorded, the mechanical timing means allowing the timing means to be operative and set to a selected time before the recorder is delivered to the operator.

---

This invention relates to recorders and, more particularly to apparatus for recording responses to questions presented on television or radio programs, or for recording votes or expressions of opinions or the like.

In certain types of television programming, it is desirable that a viewer watching the program on his own receiver and at a location quite remote from the point of origin of the program, be able to participate in the program, since such participation greatly increases the interest of the viewing audience. This participation may take the form of responses by the viewer to questions or opinions asked of the viewer during the programming period. In television programs such as audience participating quiz shows of the type wherein a large sum of money is offered as a prize for the correct answers, it is desirable that means be provided for a home viewer to participate, but means must also be provided which will assure that the viewer answers such questions at the time, and substantially only at the time when the quiz program is on the air.

It is also desirable that the viewers' responses be in a tangible form which may be mailed or otherwise delivered to a designated address where the results are to be tabulated or a winner determined. In order to allow the use of properly programmed, high speed computers for such tabulations and determinations, punch cards on which the viewer may punch his choice of answers preferably are used. Furthermore, to discourage the viewer from referring to reference aids to determine the answers before making his selection, the punch card should bear the date and time at which the punched selections were made and further bear code symbols which uniquely identify the viewer.

It is, therefore, an object of the invention to provide means for recording on a tangible record means, an operator's responses to transmitted data and which means automatically places on the record means the exact time of the recording and selected code indicia assigned to the device.

It is essential that the response recorder be made as cheat-proof as possible. Thus, it is necessary that each recorder placed in the hands of a program viewer have timing means referred to absolute time and that the mechanism forming the timing means be started before it is received by a user-viewer. Thus, a user is prevented from delaying the start of the recorder until some subsequent time after the program is finished and after the user has had a chance to use external sources to determine answers to the presented questions.

Since any program which is nationally transmitted will be heard by several million persons, it is essential that the response recording device be as simple and as cheap to manufacture as possible.

Accordingly, it is another object of the invention to provide a response recorder which has timing means for automatically indicating the time that a response is recorded, the timing means being adapted to be set to a selected time before being placed in the hands of the user and further adapted to run electrically after the response recorder is placed in operation by the user.

It is still another object of the invention to provide a response recorder which is simple in operation and cheap to manufacture.

In accordance with the present invention, the response recorder includes a manually operated punch which is adapted to punch one or more holes in rectangular tabulating cards of the type adapted to be processed by a tabulating or computing machine. Means are further provided for automatically recording on the tabulating card, the exact time at which the punch is operated.

The timing means includes a mechanical clock mechanism which has a running time of between 5 to 8 days so that the timing means may be prestarted before the device is mailed or otherwise sent to the user. Means are further provided for driving the time recorder electrically and means are included for stopping the mechanical clock mechanism whenever the electric driving means of the time recorder is operative. The timing means also includes means for allowing the mechanical driving mechanism to become operative and continue to drive the timing means whenever electric current to the electrical driving means is interrupted.

The present invention also includes coding means, which provides a continuously changing code, and which includes means for recording the instant code on the tabulating card each time the punch is operated. The coding means thus allows the matching of a selected tabulating card, such as that of a winner of a programmed contest, to be compared with the response recorder on which it was used. Thus, an additional check is provided to assure that there has been no tampering with the response recorder.

Further objects and advantages of the present invention will become apparent as the following description proceeds and the features of novelty which characterize the invention will be pointed out with particularity in the claims annexed to and forming part of this specification.

For a better understanding of the present invention, reference may be had to the accompanying drawings in which:

FIG. 3 is a front elevation with portions broken away of the response mechanism of the present invention;

FIG. 4 is a plan view of the response recording mechanism of the present invention;

FIG. 5 is a side elevation with portions removed, of the tabulating card transport mechanism of the present invention;

FIG. 8 is a partial side elevation of a modification of the card transporting mechanism of the present invention;

FIG. 9 is a plan view of the carriage member of the modification of FIG. 8; and

FIG. 10 is a front elevation of the carriage member of FIG. 9.

Figure 1:
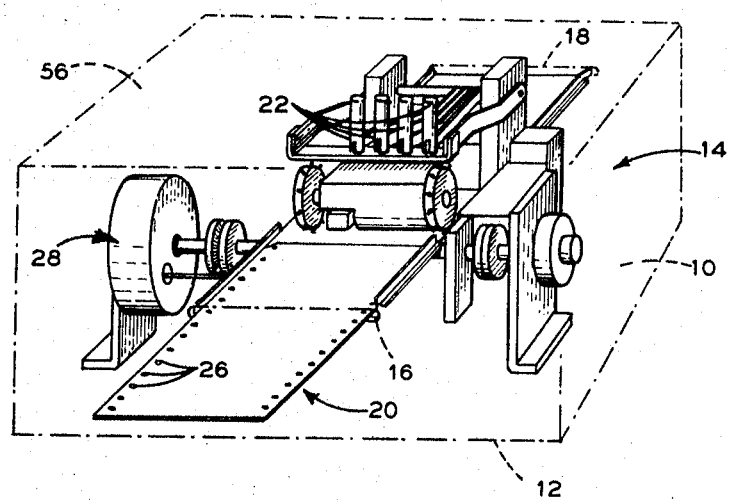
FIG. 1 is a perspective view of a commercial embodiment of the invention.
Figure 2:
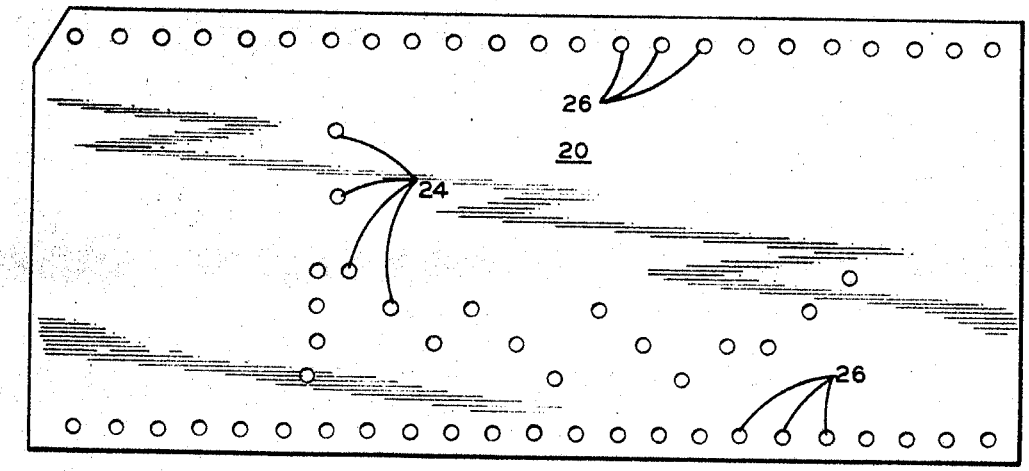
FIG. 2 is a plan view of a tabulating card, used in conjunction with the response recorder of FIG. 1.

Referring now to FIG. 1, in general the response recorder of the present invention includes a housing 10 having a base 12 on which is mounted the response recording mechanism generally indicated as 14. Preferably, housing 10 is securely fastened to base 12 in order to discourage tampering with mechanism 14. Opposing side walls of housing 10 are provided with openings 16, 18 through which a rectangular tabulating card 20 (FIG. 2) of conventional size and of the type adapted to be processed by a computer may enter and exit from the response recorder.

Briefly, in operation, card 20 is inserted through opening 16 until it engages with a punch means which has a plurality of keys 22. When one or more of push-button keys 22 is pressed downwardly, a corresponding hole 24 is punched in a selected position on card 20. Operation of the punch means also causes a card advancing means to operate and, by engaging sprocket holes 26 located near the margins of card 20, to move card 20 past the punch and out through opening 18. Each time one or more of push-buttoned punch keys 22 is depressed, by means of a timing and encoding mechanism 28, the exact time of the operation and code symbols uniquely associated with a particular response recorder are added to card 20 as by printing or embossing thereon.

Thus, when card 20 is sent to a designated address for receiving such cards, it will contain punched holes therein representative of the selected responses of the user of the present invention, and also show the exact time at which the responses were made and the code associated with the particular response recorder which punched card 20. Accordingly, if the punches on a card represent a user's answers to questions asked during a programmed contest, the winning cards may be determined from amongst millions received by quickly processing the cards in a conventional computing or tabulating machine. The honesty and identity of the individual responder submitting the winning card can then be checked by merely examining the time and encoding indicia stamped on the card.

Referring now to FIGS. 3–5, an inverted U-shaped frame 30 is affixed to base 12. Mounted on the top of frame 30 is a punch guide block 32 which has a plurality of vertically positioned bores 34. Slidably mounted in each of bores 34 is an individual cylindrical punch 36 which is urged upwardly, out of block 32 by means of an associated compression spring 38. Mounted directly beneath punch block 32 but spaced a small amount therefrom is a punch die block 39, which has a plurality of cylindrical female dies 41, positioned in axial alignment with bores 34 and adapted to receive punches 36. The length of each of punches 36 is such that whenever a selected punch is pressed downwardly against spring 38, it slidably passes into a mating die 41 in die block 39 (FIG. 5) and punches a hole in tabulating card 20, if a card has been inserted in the space 43 between block 32 and die block 39. A stripper plate 45 is positioned in space 43 and has apertures in register with dies 41. Stripper plate 45 serves to guide card 20 between blocks 32, 39 and to strip the punched material from the card.

Each key 22 is secured to one end of an individual lever 40 (FIG. 4), which overlies an associated punch 36. A shaft 42 with its ends supported by plates 44, 46 extending upwardly from frame 30, passes through the outer end of each of punch levers 40 which are spaced from each other by annular ring spacers 48, thereby allowing levers 40 to freely rotate about shaft 42. A bail 50 is positioned beneath punch keys 22 by means of arms 52, 54 which are rotatably mounted on shaft 42. Punch keys 22 project upwardly through suitable apertures located in the upper surface 56 of housing 10 and are maintained in vertical alignment thereby. A leaf spring 57, mounted on punch block 32 passes against the under surface of bail 50 to urge it upwardly against punch keys 22. Thus, when any one of keys 22 is pressed downwardly, the bottom surface thereof engages bail 50 causing it to move downwardly against the pressure exerted by spring 57. At the same time, associated key lever 40, engages one of punches 36, causing it to slide through its respective bore 34 into its corresponding die 41, and punch a hole in card 20.

Mounted transversely to the path of travel of card 20 is a shaft 58 to the ends of which are fastened a pair of sprocket wheels 60, 62. Each sprocket wheel has mounted about its outer periphery a set of sprocket teeth 64, 66, respectively, which are preferably of a rounded configuration. The spacing between adjacent teeth of each set is such that the outer tip ends thereof will engage with corresponding holes 26 when card 20 is tangentially aligned with respect to the outer periphery of sprocket wheels 60, 62. Disposed in lateral alignment with sprocket wheels 60, 62 is a guide tray 68 which extends inwardly from opening 16 in housing 10 to a point directly adjacent sprocket wheels 60, 62, as shown in FIG. 5. Tray 68 has upstanding edges 70 which serve to guide card 20 to a position beneath sprocket wheels 60, 62. The sprocket wheels are spaced on shaft 58 a distance such that the sets of sprocket teeth 64, 66 will respectively engage corresponding mating holes 26 in card 20.

A downwardly depending pawl 72 is mounted on arm 54 in a position such that the tip end 74 of the pawl tangentially engages the outer periphery of sprocket wheel 62 when bail 50 is in an upward position. When any one of punch keys 22 is pressed downwardly, thereby forcing bail 50 to move in the same direction, the tip 74 of pawl 72 engages one of sprocket teeth 66, thereby causing the sprocket wheel 62 to rotate and move punch card 20 inwardly towards punches 36 a predetermined distance depending upon the spacing between holes 26 in card 20 and the amount of rotation of the sprocket wheel. The inner face of pawl 72 has a selected contour forming a cam surface 76. Thus, when card 20 has been advanced a selected amount, cam surface 76 engages a succeeding sprocket tooth 66, with the resulting camming action thereby causing pawl 72 to cam outwardly away from sprocket teeth 66. A spring 78, connected between pawl 72 and arm 54, and a post 80 mounted on arm 54 are provided to maintain pawl 72 in a retracted position when bail 50 is in an upward resting position and none of keys 22 are depressed. A leaf spring 82, mounted on plate 44 engages the rear surface of one of the sprocket teeth 66 to prevent rotation of sprocket wheel 60 in a clockwise direction. When, during the course of operation, pawl 72 causes sprocket wheel 62 to advance in a counterclockwise direction, the sprocket tooth 66 lying immediately beneath spring 82 near the end thereof acts as a cam to push spring 82 out of engagement with any of sprocket teeth 66 and the forward edge 84 of spring 82.

Continuation of downward pressure on a selected one of keys 22 causes its corresponding punch lever 40 to press its respective punch 36 through card 20 and into a mating die 41 in die block 39. It will be seen then, that in accordance with the mechanism just described, the depressing of any one of keys 22 causes card 20 to advance a predetermined distance and a hole to be punched therein after the predetermined distance has been travelled. Successive depressions of keys 22 will therefore cause the card 20 to pass from the opening 16, through the response recording mechanism 14 and out through exit opening 18 in housing 10.

An important feature of the present invention is the provision of tamper proof means for recording substantially the exact time of operation of any of punch keys 22 on card 20. Accordingly, with reference to FIG. 6, wherein such a tamper proof timing means is shown in detail, a conventional mechanical clock movement 88 is mounted on base 12.

Clock movement 88 preferably has at least 8 days of running time before it has run down and therefore may be set accurately at the point of distribution of the invention, so that it is running at the time that it is received by the user. The 8-day running movement would normally allow for the usual delays in shipment to points quite remote from the distribution source. Clock mechanism 88 has an output shaft 90 which is driven at a suitable speed such as one revolution per hour or it may be driven at any other speed proportional to time as may be desired. Shaft 90 is connected to a clutch face plate 92 of a clutch 91. Face plate 92 is adapted to engage with a complementary face plate 94, attached to a shaft 96. For purposes of illustration, clutch 91 is shown as being of the positive, gear tooth engagement type wherein plate 94 has a single tooth which is adapted to mesh with any one of a number of teeth disposed on an outer surface of face plate 92. Of course, any suitable friction clutch may be used if desired.

Attached to the other end of shaft 96 is a clutch plate 98 of a clutch 100, which is adapted to engage with a mating face plate 102. Clutch 100 is similar in configuration to clutch 91. Clutch face place 102 is mounted on a shaft 104 and is driven by a conventional electric timer motor 106 which, for example, may be a self-starting synchronous clock motor. Shaft 104 may be driven at any speed which is proportional to time, provided both shafts 90 and 104 are driven by their respective driving mechanisms at the same speed.

Figure 6:
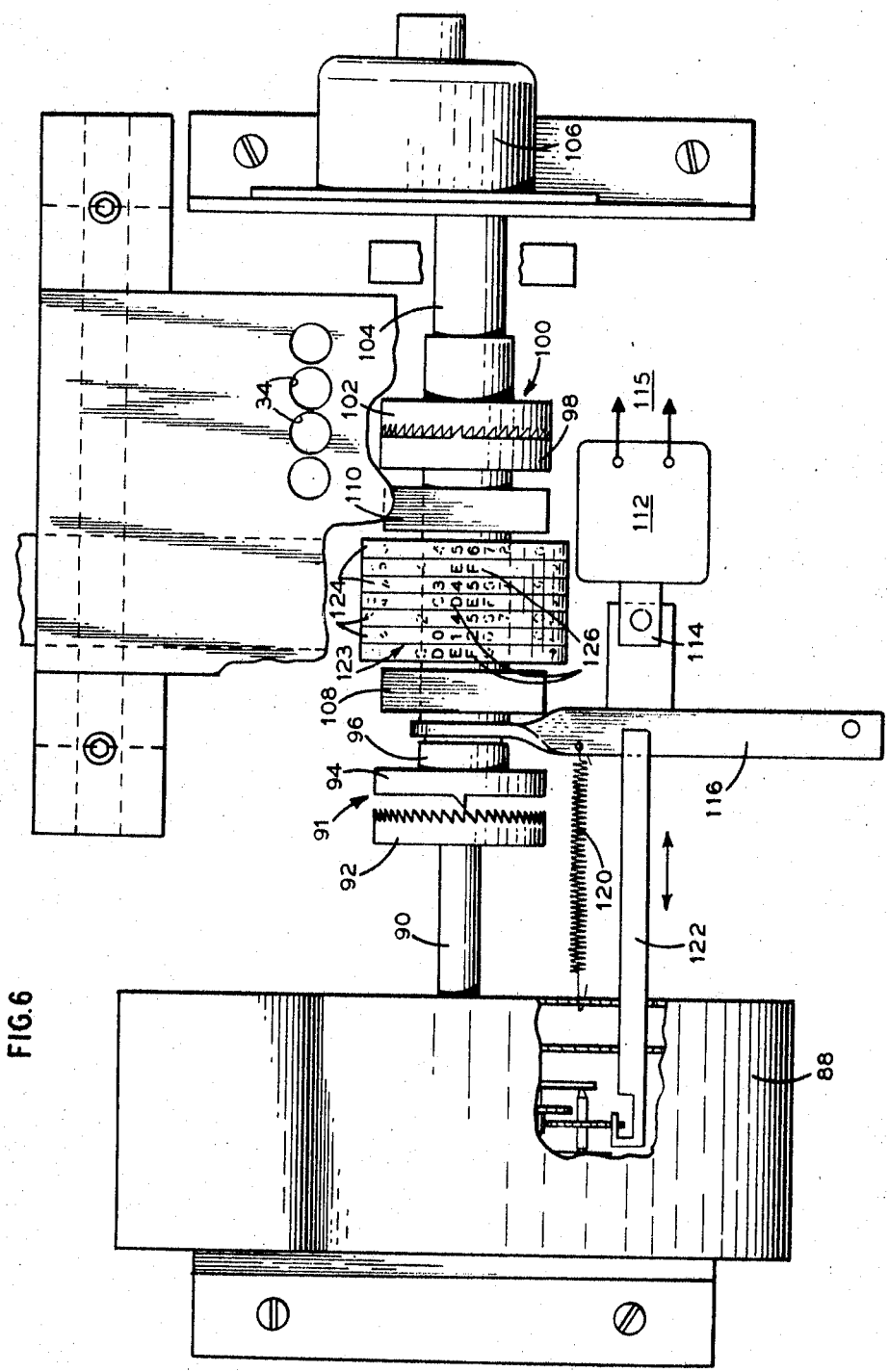
FIG. 6 is a plan view with portions broken away or removed, of the timing and coding means of the present invention.

Shaft 96 is slidably mounted in bearings in vertical plates 108, 110 which, in turn, are secured to base 12 (FIGS. 3 and 6). Shaft 96 is free to move laterally between clutch face plates 92, 102 which are spaced sufficiently apart from each other so that when one of clutches 91, 100 is disengaged, the other clutch is engaged. An AC solenoid 112 mounted adjacent shaft 96 and shown in an energized condition has connected to its operating plunger 114 and at right angles thereto an outwardly extending arm 116. One end of arm 116 is pivotally mounted on an upstanding post 118, affixed to base 12 (FIG. 3). The other end of arm 116 is loosely coupled to a groove in shaft 96, so that energization of solenoid 112 causes plunger 114 and arm 116 to move laterally from left to right, thereby causing clutch 91 to be disengaged and clutch 100 to engage. A spring 120 is fastened between arm 116 and the housing of mechanical clock mechanism 88 and serves to urge arm 116 leftward when solenoid 112 is de-energized, thus disengaging clutch 100 and engaging clutch 91 to allow the mechanical timer mechanism 88 to drive shaft 96.

Figure 7:
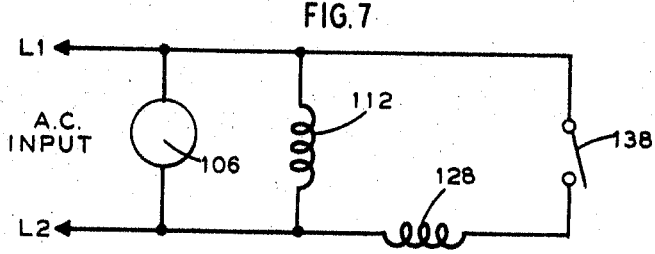
FIG. 7 is a schematic wiring diagram of the control circuit of the present invention.

Accordingly, when the response recording mechanism of the present invention is delivered to its intended user, the preset mechanical timing mechanism 88 is already driving shaft 96. As soon as the user connects input terminals 115 of solenoid 112 to a source of AC energy, solenoid 112 is energized, thereby instantly transferring the driving of shaft 96 from mechanical timing mechanism 88 to the electrical clock motor 106 attached to shaft 104, which also is energized simultaneously with solenoid 112 as shown in the schematic wiring diagram of FIG. 7.

Rigidly attached to arm 116 is a stop lever 122 which extends outwardly from arm 116 to actuate a conventional clock stop motion device associated with mechanical clock mechanism 88. This arrangement is such that when solenoid 112 is energized and stop lever 122 is moved laterally, the stop movement mechanism of clock mechanism 88 will be actuated, thereby stopping the mechanical drive of shaft 90. However, upon de-energization of solenoid 112, the stop movement is released, thus allowing mechanical timer 88 to again commence driving shaft 90. Thus, there is substantially no interruption in the driving of shaft 96 whenever input AC power is applied or removed from solenoid 112 and electrical clock motor 106.

Assembled on shaft 96 are a plurality of conventional, gear driven, counter wheels 124 which are adapted to rotate with shaft 96 and are of the type which may have their indicia preset to any selected combination. Counter wheels 124 of the group generally indicated as 123, are so geared that the numerical indicia thereon will at any instant show the chronological increase in time with respect to the selected time at which they are initially set. The gearing of counter wheels 124 is selected in conjunction with the speed of shaft 96 so that at any instant, counter wheels 124 will indicate substantially the exact amount of time which has elapsed since the initial setting thereof.

For example, in one embodiment of the invention, three counter wheels 124 were provided. A first wheel had 24 indicia representing elapsed minutes and was driven at a speed to cycle once each hour, so that each indicia represented 2½ minutes elapsed time. A second wheel was geared to rotate once each 24 hours and had indicia representative of each hour. A third wheel also had 24 indicia but indexed only once a day so that it cycled after 24 days had elapsed. Even though the date is incorrect when compared to a calendar after the first 24 days have passed, yet for the purposes of the present invention three such wheels are sufficient since six months must elapse before the first 24 day sequence is repeated.

Interposed between selected ones of counter wheels 124 are code wheels 126, three of which are shown for purposes of illustration. If desired, code wheels 126 may be assembled in juxtaposition on shaft 96. Code wheels 126 are continuously driven by shaft 96 and may be selectively set initially at the time at which counter wheels 124 are set to produce a preselected code. For example, a typical code wheel may have any desired indicia on its outer periphery and may be subdivided into 48 divisions, with the code wheels as shown. This will permit 110,592 different combinations. Thus, a large number of response recording mechanisms may have a code assigned thereto without a repetition. It is advantageous to allow the code wheels 126 to be rotatably driven by shaft 96. Since a code selection is made at the instant at which the time is set into a selected unit and the rate is known at which the code indicia changes, then the correct code which should occur at any subsequent time and date will be known. Thus, the closeness of the time at which subsequent responses are made is easily determined from the time and code combination appearing on punched card 20, since such information is stamped thereon by a mechanism which will now be described.

Referring again to FIG. 5, a solenoid 128 mounted on a wall of punch block 32, has an operating plunger 130 linked to a stamping plate 132 which in turn is rotatably mounted on a pivot pin 134, which is located in punch block 32. Stamping plate 132 extends inwardly through an opening in punch block 32, and has an end 136 which overlies counter wheels 124 and code wheels 126. A snap switch 138 (FIG. 4) is connected in series with solenoid 128 and a source of AC input (FIG. 7) and is positioned on punch block 32 in such a manner that the downward movement of bail 50 will cause snap switch 138 to close and energize solenoid 128, thereby causing plunger 130 to retract and the end 136 of stamping plate 132 to move downwardly against counter wheels 124 and code wheels 126 which preferably have raised indicia thereon.

If punch card 20 is treated on at least one side with a conventional pressure sensitive ink, then the downward movement of stamping plate 132 against the counter and code wheels will cause the indicia appearing directly beneath end 136 of the stamping plate to appear on card 20. Closing of snap switch 138 may be adjusted to occur after one of punches 36 has penetrated card 20. Accordingly, each time punch 36 is actuated, the time and code combinations of that instant will be printed on card 20.

While for purposes of illustration the raised time and code indicia are shown as operating in conjunction with a pressure sensitive inked card, it will be understood that any other suitable marking means may be used if desired. For example, an inking pad arrangement may be provided wherein the raised indicia are inked by passing across the inking pad, and the ink from selected time and code indicia is applied to the card 20 when a punch 36 is operated.

A modification of the card transport mechanism is shown in FIGS. 8–10. In order to provide a more positive acting card advancing means, the pawl and sprocket arrangement of FIGS. 3–6 has been replaced with the organization shown in FIGS. 8–10. However, punch keys 22, punches 36, punch block 32, die block 39, punch levers 40, and bail 50 remain unchanged. Therefore, for the sake of simplicity, the same reference numerals are retained in FIG. 8. Arms 52, 54 have been replaced by bell crank levers 200, which are rotatably mounted on a shaft 204, positioned in vertical plates 206. These plates are affixed to the rear of a punch block 32.

Slidably mounted below punch die block 39 is a U-shaped carriage member 210 (FIGS. 9–10) which has a pair of teeth 212, 214 projecting upwardly from the upper surface of the legs 216, 218 of U-shaped member 210. A shaft 220 passes transversely through each leg 216, 218 and is positioned therein by collars 222, 224. A cut-out portion 226 of block 39 extends beneath punch block 32 and has a transverse slot 228. Carriage 210 is positioned beneath cut-out portion 226 with shaft 220 slidably mounted in slot 228.

A tension spring 230 is inclinedly secured to a post 232 in block 39 and to a post 234, mounted on leg 216 of carriage 210. Due to its inclined position, spring 230 urges member 210 upwardly against the lower surface of cut out portion 226. Arm 334 of bell crank lever 200 engages the outer end of shaft 220 which extends beyond collar 222. Pivotally attached to the side of die block 39 is an arm 236 which has an upwardly extending finger 238. Arm 236 is urged in the upward position by a leaf spring 240. For the sake of brevity, only one side of the modified transport mechanism of FIG. 8 is shown and described. However, it will be understood that the other side thereof has elements which are duplicates of bell crank lever 200, posts 232, 234, arm 236, finger 238, leaf spring 240 and function in an identical manner to provide a double transporting action for card 20.

In operation, card 20 is inserted in slot opening 16 in housing 10 as described above. Whenever, one of punch keys 22 is depressed, bail 50 moves downwardly, causing bell crank arm 334 to engage shaft 220 and slide carriage 210 laterally to the right. Teeth 212, and finger 238 are so positioned with respect to each other and with respect to the spacing between adjacent holes 26 in card 20, that they each project upwardly through a corresponding hole 26 when bail 50 is in its upward, resting position. However, when bail 50 is depressed and carriage 210 starts to move laterally, the inclined surfaces of teeth 212 act as cam surfaces against corresponding holes 26 and thereby cause carriage 210 to rotate downwardly and retract teeth 212 during its lateral movement. Card 20 is prevented from moving at this instant by the vertical surface of finger 238 projecting through and abutting the wall of an aligned hole 26 in card 20.

When bail 50 has been completely depressed and bell crank arm has travelled to its outer limit, teeth 212 then become aligned with a new set of holes 26 in card 20, and accordingly project therethrough, allowing carriage 210 to rotate upwardly to its original position. On the return movement of bail 50, after a selected hole 24 has been punched in card 20, the card is advanced forwardly towards the left by the leftward lateral movement of returning carriage 210 urged by spring 230. Since the vertical surfaces of teeth 212 now abut the walls of the new set of aligned holes 26, the card 20 is forced to move therewith. During this motion, arm 236 rotates downwardly against pressure provided by spring 240, due to the camming action between the inclined surface of finger 238 and its previously aligned hole 26, since card 20 is now moving in a direction favorable to producing this action. When bell crank arm has finally returned to its forward, resting position, card 20 will have been advanced a selected distance and will be ready for receiving a new punching cycle. Finger 238 and teeth 212, 214 will then be projecting through a new set of apertures 26, thereby holding card 20 in place until the new punching cycle is commenced.

While this invention has been shown and described in the best form known, it will nevertheless be understood that this is purely exemplary and that modifications may be made without departing from the spirit and scope of the invention. For example, it will be understood that any suitable record marking means such as discrete ink marking devices may be employed to mark the tabulating cards to record selected responses, instead of punching holes therein.

What is claimed is:

1. A recorder for recording the selective responses of individual users comprising recording means for recording discrete responses of a user on a record element, timing means having continuously changing indicia means representative of a selected time, said timing means including a mechanically driven timer, an electrically driven timer, and means for activating one of the timers to drive said timing means when the other of said timers is inactivated so that the operation of said timers is mutually exclusive, coding means having code indicia means representative of a selected code, and means coupled to said recording means and operative, in response to actuation of said recording means when a selected response is recorded, for causing said time and code indicia means to produce the instant time and code indications on said record element.

2. The invention defined in claim 1, wherein said coding means is coupled to said timing means and the code produced by said code indicia means is changed continuously with respect to time.

3. The invention defined in claim 2, wherein said coding means includes a plurality of code wheels having said indicia disposed around the outer periphery thereof and includes means for setting said wheels to produce a predetermined code combination formed from said indicia.

4. The invention defined in claim 1, wherein each of said timers has an individual clutch coupling its associated timer to said timing means, and said timing means includes means for disengaging one of said clutches whenever the other of said clutches is engaged.

5. The invention defined in claim 1, including means operative in response to the activation of said electrically driven timer for disabling said mechanically driven timer.

6. The invention defined in claim 4, including electrically responsive means for engaging said mechanical timer clutch and disengaging said electrical timer clutch whenever electrical power fails to be applied to said electrically responsive means.

7. A recorder for recording the selective responses of individual users comprising means for making choices representative of selected responses, recording means actuated by any of said choice making means for recording a discrete choice of a user on a card, means operative in response to actuation of said choice making means for advancing said card through said recorder a predetermined distance prior to actuation of said choice recording means, timing means having continuously changing indicia means representative of a selected time, coding means having code indicia means representative of a selected code, and means operative in response to recording of a choice for impressing said indicia representative of the instant time and said indicia representative of said selected code on said tabulating card, said card having a row of evenly spaced apertures near one marginal edge thereof, said card advancing means including a movable carriage having at least one projecting tooth for engaging with one of said apertures in said card and a movable finger for engaging another of said apertures, and further including means for moving said carriage in opposing first and second directions in response to actuation of said choice making means, said carriage having means for retracting said tooth out of engagement with said aperture when said carriage moves in said first direction, said finger being disposed to hold said card in a fixed position during movement of said carriage in said first direction, said tooth being adapted to engage another aperture at the end of said movement of said carriage in said first direction and advance said card a predetermined distance when said carriage moves in said second direction, said card advancing means including means for retracting said finger out of engagement with its corresponding apertures when said carriage moves in said second direction.

8. A recorder for recording the selective responses of individual users comprising a plurality of individually operable keys, a plurality of individual punches each associated with one of said keys and operative to punch an aperture in a tabulating card when a selected one of said keys is actuated, means operative in response to actuation of any of said keys for advancing said card through said recorder a predetermined distance prior to actuation of any of said punches, a mechanically driven timer and an electrically driven timer, a plurality of timing wheels rotatably mounted along the path of travel of said card, each of said wheels having indicia disposed around the outer periphery thereof and representative of a selected time, a plurality of code wheels rotatably mounted along the path of travel of said card, each of said wheels having indicia disposed around the outer periphery thereof to produce a predetermined code combination formed from said indicia, individual means for selectively coupling each of said timers to said timing wheels and said code wheels to drive said wheels at a selected speed, said coupling means including means for disengaging one of said coupling means when the other coupling means is engaged, and means operative in response to actuation of one of said keys and after said card has advanced said predetermined distance for impressing said indicia representative of the instant time and said indicia representative of the instant code on said card.

9. Advancing mechanism for a tabulating card of the type having a row of evenly spaced apertures near one marginal edge thereof, comprising a movable carriage for advancing said card a predetermined distance having at least one projecting tooth for engaging with one of said apertures in said card and a movable finger for engaging another of said apertures, and further includes means for moving said carriage in opposing first and second directions, said carriage having means for retracting said tooth out of engagement with one of said apertures when said carriage moves in said first direction, said finger being disposed to hold said card in a fixed position during movement of said carriage in said first direction, said tooth being adapted to engage another aperture at the end of said movement of said carriage in said first direction and advance said card a predetermined distance when said carriage moves in said second direction, said card advancing means including means for retracting said finger out of engagement with its corresponding aperture when said carriage moves in said second direction.

References Cited
UNITED STATES PATENTS

| | | | |
|---|---|---|---|
| 720,957 | 2/1903 | Ongley | 346—59 |
| 842,132 | 1/1907 | Blair | 346—95 X |
| 1,315,201 | 9/1919 | Bauer | 346—59 X |
| 3,084,014 | 4/1963 | Molloy | 346—134 X |

RICHARD B. WILKINSON, Primary Examiner

J. W. HARTARY, Assistant Examiner

U.S. Cl. X.R.

346—79, 104, 134